June 5, 1945.  G. A. BOLE ET AL  2,377,666
METHOD FOR MANUFACTURING PYROMETRIC CONES
Filed Aug. 18, 1943  2 Sheets-Sheet 1
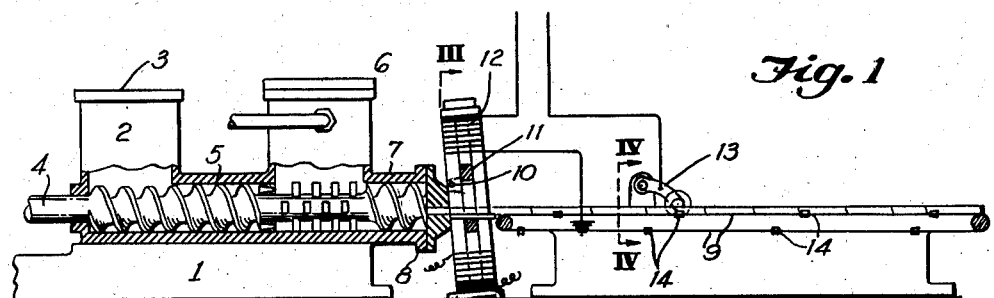
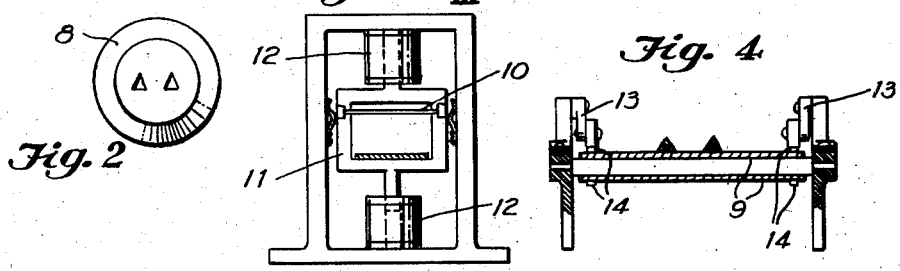
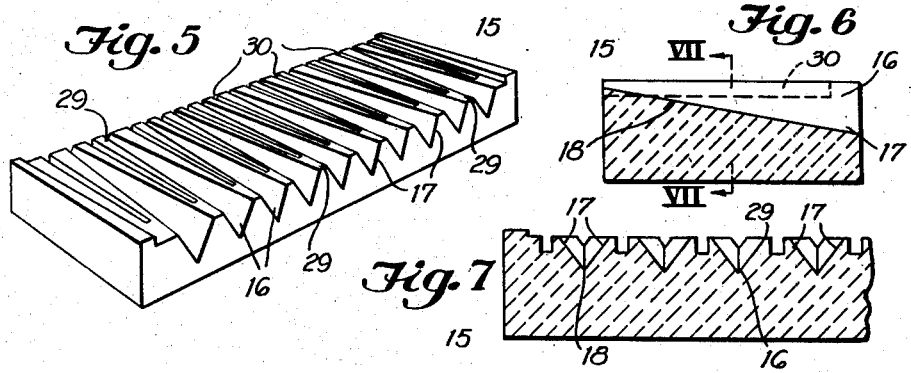
Inventors
GEORGE A. BOLE
MYRIL C. SHAW
HARRY E. COVAN
By H. S. McDowell
Attorney

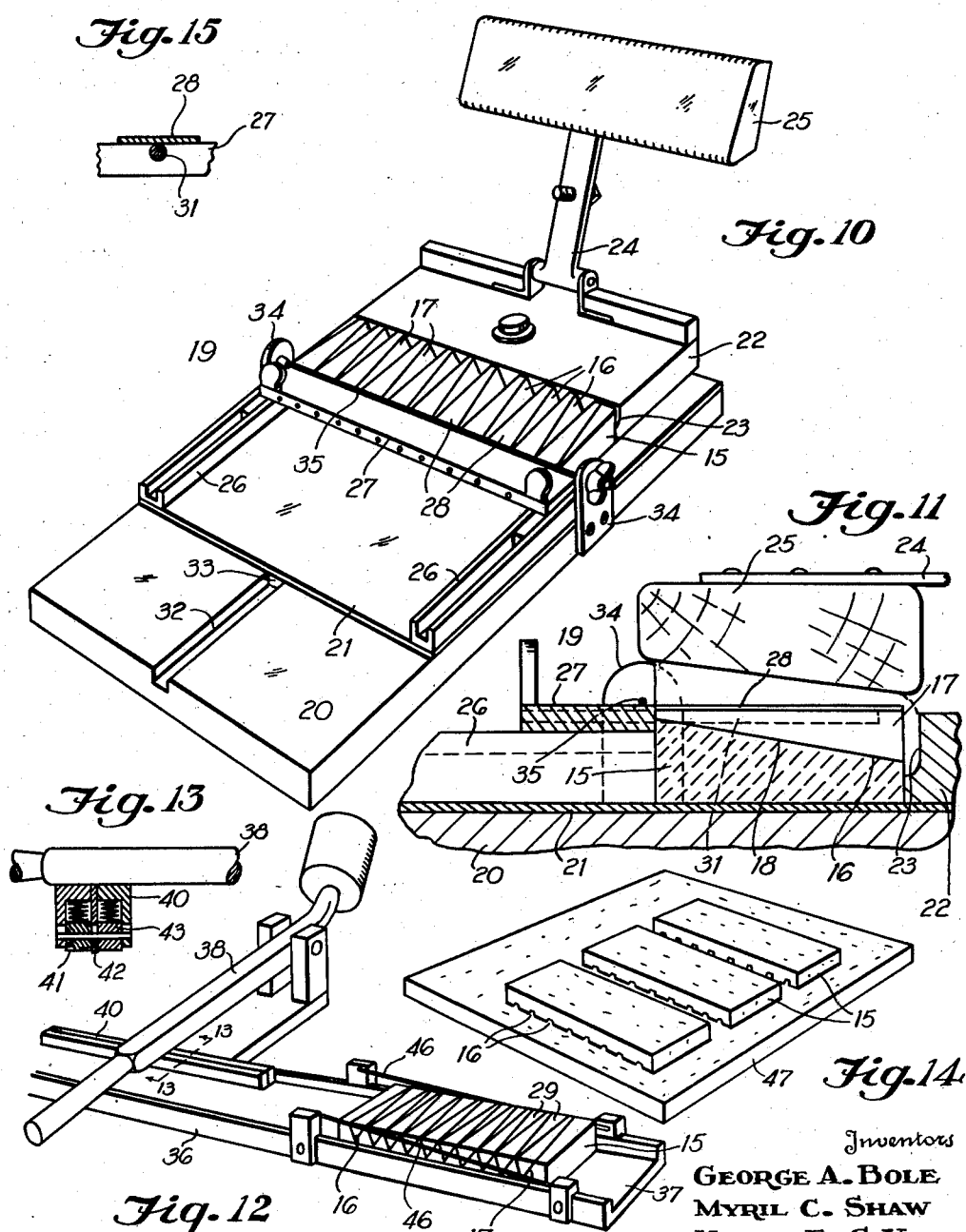

Patented June 5, 1945

2,377,666

UNITED STATES PATENT OFFICE 2,377,666

METHOD FOR MANUFACTURING PYROMETRIC CONES

George A. Bole, Myril C. Shaw, and Harry E. Co Van, Columbus, Ohio, assignors to The Edward Orton Jr. Ceramic Foundation, Columbus, Ohio, a testamentary trust Application August 18, 1943, Serial No. 499,148

2 Claims. (Cl. 25—156)

This invention relates to an improved method for molding ceramic bodies, and although it is not so limited, the invention has particular application to the production of pyrometric cones.

Such cones comprise three-sided pyramidal bodies of ceramic composition. In their practical employment, the same cones are used for determining firing temperatures in kilns in which ceramic products of various types are subjected to firing or maturing temperatures. When so used, the larger or base ends of the cones are embedded in plaques with the cones arranged in upright positions and slightly inclined in a forward direction with respect to the vertical. These plaque-carried cones are placed in the firing zones of kilns and when the latter are fired and desired maturing heat treatment therein attained, such heat-treating conditions may be readily ascertained by observing the physical condition of the cones, the latter being so formed and positioned that at predetermined heat treatment, the glassy phase of the composition from which they are formed softens, allowing the cones to bend forwardly and downwardly from their normally straight and upright positions, such bending or deflection of the cones serving as a reliable means for ascertaining the heat treatment producing maturity of the ceramic ware.

It is important in their manufacture that such cones shall possess uniform and standardized properties, so that duplicate cones will uniformly respond to predetermined kiln temperatures of narrow range in precisely the same manner. Methods heretofore employed in the manufacture of such cones have not resulted in imparting thereto desired uniformity. This condition is attributable, at least in part, to the use of molding apparatus and procedures requiring the exercise of skill and care on the part of the personnel engaged in making the cones. Also, the workability of the individual batches, the temperature and humidity of the workroom and many other conditions were factors in the production of satisfactory cones under prior systems, these variables having been eliminated by the present invention.

A common practice has consisted in inserting clay in a moldable, moisture-containing plastic state in the cavities of metallic molds, surplus material being then removed in order to leave within the cavities soft clay bodies having, in general, the desired shape of commercial cones. Practically, however considerable variation in proportion has been present, such variations having been due to different causes, such as the failure of the operator to fill completely the cavities with the moldable material, particularly at the end portions of the cavities, with the result that inequalities in the length or height of the cones has been a matter of common occurrence. Also in such prior practice, immediately following the molding of the undried cones, the latter by a manually executed operation, and while still in a moist plastic state, were removed from the mold cavities and deposited on drying pallets. Such handling of the plastic cones result, quite frequently, in setting up therein internal stresses and strains which, upon subsequent drying of the cones, caused their warpage or deflection, rendering the cones imperfect and unsuitable for commercial use.

It is, therefore, an object of the present invention to provide an improved method for molding pyrometric cones, wherein the latter are characterized by their structural uniformity, their bending response to predetermined kiln temperatures of limited range, and their standardized weight, composition and dimensions.

Another object is to provide an improved method for making such cones wherein the cones remain untouched by the fingers of operators throughout the molding and drying operations.

A further object of the invention is to provide an improved method for making such cones wherein the mold is composed of a moisture-absorbing material, such as plaster, and in which mold the cones are retained until the material comprising the same is sufficiently dried so that internal stresses and strains, incident to handling, will not occur therein.

Still, a further object of the invention is to systematize and render more efficient and less costly the manufacture of pyrometric cones with respect to prior procedures.

For a further understanding of the invention, reference is to be had to the following description and the accompanying drawings, wherein:

Fig. 1 is a diagrammatic view, partly in side elevation and vertical section, of extrusion apparatus for producing pugged and de-aired clay columns, and for cutting such columns into blanks suitable for insertion in molds;

Fig. 2 is an end elevational view of the die head of the extrusion apparatus;

Fig. 3 is a front elevational view of the solenoid operated column-cutting mechanism;

Fig. 4 is a transverse vertical sectional view taken through the conveyor belt and its associated switch mechanism;

Fig. 5 is a perspective view of one of the molds;

Fig. 6 is a vertical transverse sectional view taken through the mold;

Fig. 7 is a fragmentary longitudinal sectional view taken through the mold on the plane indicated by the line 7—7 of Fig. 6;

Fig. 8 is a perspective view of a pyrometric cone formed in accordance with the present invention;

Fig. 9 is a similar view of one of the soft clay blanks adapted for insertion in the mold cavities;

Fig. 10 is a perspective view disclosing the mold press, with the head of the press disposed in its elevated position;

Fig. 11 is a fragmentary vertical longitudinal sectional view taken through the press and disclosing the head thereof in its lowered position;

Fig. 12 is a perspective view disclosing the means for stamping indicia on the cones and the associated means for severing surplus material from the ends of the mold cavities;

Fig. 13 is a detail sectional view on the line 13—13 of Fig. 12;

Fig. 14 is a perspective view disclosing the molds when positioned on a drying pallet;

Fig. 15 is a detail transverse sectional view disclosing the reenforcing rods for the mold-protecting fingers of the press mechanism.

In accordance with the present invention, the pyrometric cones are produced by pugging a mass of moisture-containing plastic cone mix and, following such pugging, and while the body is in a granulated or discrete state, the same is passed through a chamber in which a partial vacuum is continuously maintained, whereby to remove from the batch occluded air. From this de-airing chamber, the clay mixture is forced through an extrusion die by a continuing operation to form a dense, homogeneous column or ribbon. This column is delivered to a traveling conveyor through two equilateral triangular orifices in a metal die, and, preferably, by automatic means, the column is severed transversely at spaced longitudinal intervals to provide on the belt cone-forming blanks of desired length. These blanks are removed from the conveyor belt and, by a manual operation, are inserted into the cone-shaping cavities of plaster molds, the material in each blank being present in excess amounts, above that actually needed to completely fill the mold cavities in which the same are inserted.

The molds are then transferred to a pressing machine having a movable head, and through the operation of this head, the clay material is forced firmly into the mold cavities, completely and uniformly filling the latter. Following the pressing operation, the mold is brought into engagement with wire cutters, which remove the surplus clay material from the top and sides of the mold, leaving within the cavities the shaped and precise amount of material necessary to form the commercial cones. The molds are then inverted and placed face down on plaster slabs or pallets so that the exposed upper surfaces of the cones contained in the mold cavities will bear against a moisture-absorbing material. The cones are so retained under room temperatures until the same have partially dried and shrunk, attaining a permanent form, such drying being effected as a result of the absorption of moisture from the cones by the plaster walls of the molds and the associated slabs or pallets. During these operations, except for the placing of the cone-forming blanks in the mold cavities, the cones are not touched by hand but, on the contrary, are retained in a supported state in the molds until the initial drying operation has been completed and the cones have reached a state where the same may be handled without developing therein internal strains and stresses. After such initial drying, the elevation of the molds will permit the cones to fall out of the cavities and rest on the slabs or pallets and final drying of the cones may then be accelerated by positioning the same in an artificially heated drier.

Apparatus suitable for accomplishing these operations has been diagrammatically illustrated in the accompanying drawings, although it should be understood that other suitable apparatus may be employed. In Fig. 1 of the drawings, there has been disclosed a clay extrustion machine comprising a bed 1, having mounted thereon a clay pugging section 2 having a hopper or magazine 3 in which batches of moist clay are introduced from time to time during the operation of the machine. The pugging section includes the usual clay mixing and advancing augers, operated by a motor driven shaft 4, the mixed or pugged clay being advanced from the section 2 through a granulating or disintegrating section 5 and thence into a de-airing section 6. A partial vacuum is maintained on the clay mixture within said de-airing section in order to remove from the clay as much of the free and occluded air as is practicable, whereby to render the clay mixture dense and homogeneous throughout its mass. The clay is then advanced by a suitable auger through an extrusion section 7, the latter having a die 8 provided at its discharge end. This die is provided with one or more extrusion openings which are approximately triangular in cross section, the clay column or ribbon extruded from the die, therefore, having approximately the cross sectional configuration of a pyrometric cone.

The clay column or ribbon is delivered by the extrusion machine to the upper surface of a movable conveyor belt 9 and as the material travels along this belt, the same is cut transversely to produce cone-forming blanks of suitable length for insertion into the cavities of a mold. In a desirable form of the apparatus, the cutting of the clay column or ribbon is accomplished by means of a wire cutter 10. The latter has its ends tensionably connected with a reciprocating armature frame 11, the upper and lower ends of the frame being positioned within the coils of solenoids 12. These coils are alternately energized and deenergized by being electrically connected with movable switch arms 13 arranged contiguous to the longitudinal edges of the belt 9. These belts carry spaced electrical contacts 14, which are in circuit with the solenoid coils. When a switch arm engages one of these contacts, the solenoid coil joined with the switch arm is energized, attracting the armature and moving the wire cutter across the face of the extrusion die 8, thereby severing the clay column transversely as it is being extruded from the head.

This cutting mechanism has been more fully disclosed in our accompanying application, entitled Extruding and cutting apparatus, executed of even date herewith. While other equivalent mechanism may be used in producing these cone-forming blanks, we have found that superior cones are produced from extruded clay columns which have been thoroughly pugged and de-aired.

The cone-forming blanks are removed from the belt 9 and manually inserted into the cavities of a mold of the type shown at 15. This mold in a practical embodiment is of block-like form and is composed of a water-absorbing material, such as calcium sulphate compounds, particularly plaster of Paris. Each mold is provided with a plurality of cone-forming cavities 16, the same being open at their tops and ends and having V-shaped side walls 17, each cavity having a bottom edge 18 inclined at an acute angle with respect to the horizontal, so that the cavity at one side or end of the mold is comparatively deep and at the other side or end relatively shallow.

With the blanks positioned in the various cavities of the mold, the latter is transferred to a pressing machine disclosed at 19. While this machine has been disclosed in detail, in our application entitled "Machine for molding pyrometric cones" and executed of even date herewith, the same embodies generally a bed 20 on which is arranged a sliding bed plate 21. The bed plate carries at one end a mold-positioning block 22, the said block having an upright shouldered wall 23 and against this wall one of the side edges of a mold 15 is positioned. Carried by the block 22 is a pivoted arm 24, and upon the outer end of this arm there is mounted a mold-pressing head 25.

Arranged on the upper surface of the bed plate 21 are guides 26, which effect the slidable support of a finger bar 27. This bar carries a plurality of spaced, forwardly projecting, metallic fingers 28 of triangular configuration which project over and protect the triangular upper surfaces 29 of the mold 15, which surfaces are disposed between the mold cavities 16. In the surfaces 29, the mold is provided with grooves 30, which receive supporting and reenforcing rods 31 carried by the bar 27 and arranged immediately beneath the fingers 28.

The bed 20 is provided centrally with a groove 32 which receives a rib 33 depending, as a guide element, from the bed plate 21. Also, the sides of the bed 20 are provided with brackets 34, which effect the support of a tensionable wire cutter 35.

In the use of this pressing machine, a mold, having the clay cone-forming blanks inserted in its cavities, is positioned against the wall 23 of the block 22, and with the shallower ends of the cavities disposed toward the finger bar 27. This bar is then moved on its guides 26 so that the fingers 28 are arranged over and in protecting relationship with the surfaces 29 of the mold, the reenforcing rods 31 of said fingers occupying the grooves 30. With the molds so positioned, the pressing head 25 is forced downwardly, pressing the clay blanks firmly into the mold cavities and completely and compactly filling the latter. The bed plate 21 is then moved rearwardly, causing the cutter wire 35 to wipingly engage the upper surfaces of the fingers 28, producing on the plastic clay bodies, arranged within the mold cavities, a smooth, clean upper surface. The excess material released by this cutting operation adheres to the contacting surfaces of the head 25 and, after the latter has been raised, may be removed therefrom.

The mold is then removed from the pressing machine and is placed on a table 36 having a longitudinal guideway 37, the width of which guideway approximates that of the mold. At one end of this guideway, there is arranged a counterbalanced lever 38 which carries at its outer end a cross arm 40. This arm carries cone-marking dies disclosed at 41, 42 and 43, the latter being so shaped that when the lever 38 is swung downwardly, the dies will impress in the larger or base ends of the cones informative indicia, such as a depth mark 44 which indicates on the cone 45 the depth at which the cone should be embedded in a supporting plaque. Also, the dies may stamp on the cone an identifying number or other symbol disclosing, in a manner known to the trade, the temperature characteristics of the particular cone bearing the symbol, and the third of these dies may stamp on the cone the manufacturer's trade-mark.

Following this stamping operation, the molds are advanced longitudinally of the guideway 37 and are brought into engagement with a pair of cutter wires 46. The movement of the mold past these cutter wires severs from the cones any surplus material which may project from the open ends of the cavities, producing smooth base and apex surfaces and causing the cones to possess a uniform length or height dimension.

Upon the removal of the mold or molds from the table 36, the same are inverted and placed face down upon a plaster slab or pallet 47, so that the exposed upper surfaces of the cones will be brought into engagement with a moisture-absorbing body corresponding in this respect to the material from which the molds are formed. Under such conditions, the cones are retained within the molds and in contact with the slabs or pallets for a period of from 2 to 3 hours. At the conclusion of this period, sufficient moisture will have been absorbed from the cones by the molds and the slabs or pallets and, also, as a result of air drying, to cause the cones to set and harden and assume permanent form.

It will be noted that during the pressing, cutting and drying operations, the cones are continuously retained within the molds and are not subjected to manual handling, as heretofore. As previously stated, when cones in the plastic state are removed from the molds, such an operation is quite likely to set up internal stresses which result in the final formation of imperfect products. This condition is expressly overcome by the procedure above set forth.

Following the initial setting and drying of the cones, and upon their attaining a desired degree of permanency in their structure, the molds are lifted from the slabs or pallets 47. Due to drying shrinkages, the cones freely drop out of the cavities 16 and may remain on the upper surfaces of the slabs or pallets or other support. If desired, the same may then be inserted in an artificially heated drier maintained at a temperature approximately 150° F. for a period of 12 hours, thus completing the manufacturing operations. In practice, these cones are then packed in cartons or boxes for shipment to points of use.

In view of the foregoing, it will be seen that the present invention provides an improved method and apparatus adapted for the systematic, rapid and uniform production of pyrometric cones. Cones so produced will respond uniformly in a definite and predetermined manner to different firing temperatures used in the kiln burning of ceramic products. The cones of any given set are uniform in weight and dimensional factors and constitute reliable temperature indicators for the use set forth. The invention further has the advantage of permitting such cones to be produced rapidly, at low cost and without employing necessarily highly skilled operators.

While we have expressed our invention in terms of its use in the manufacture of pyrometric cones, nevertheless, it will be understood that our invention is applicable to the manufacture of many other molded ceramic articles intended for entirely different uses.

We claim:

1. The method of producing pyrometric cones which comprises severing a column of de-aired extruded cone-forming material to form molding blanks of appropriate length, placing said blanks in a multiple cavity mold in which each cavity possesses a lesser volumetric capacity than the volume of the blank inserted therein, subjecting the blanks while in said mold to pressure sufficient to cause the material comprising said blanks to completely fill the full volume of said cavities, while pressure is maintained on the blanks effecting relative movement between the mold and a cutting instrumentality in order to sever and remove surplus material disposed above the mold cavities, moving the sides of the mold past second cutting instrumentalities to remove surplus material projecting from the ends of the mold cavities, and without removing the cone-forming material from the mold cavities causing said material to dry.

2. The method of producing pyrometric cones which comprises severing a column of extruded cone-forming material to form molding blanks of appropriate length and body, placing said blanks in the cavities of the mold wherein each cavity possesses a lesser volumetric capacity than the volume of the blank inserted therein, subjecting the blanks while in the mold to pressure sufficient to cause the moldable material to fill completely the full volume of each cavity, while pressure is maintained on the blank effecting relative movement between the mold and a cutting instrumentality in order to sever and remove surplus material disposed above the mold cavities, moving the sides of the mold past second cutting instrumentalities to remove surplus material projecting from the ends of the mold cavities, inverting the molds and placing the same face down on a slab having water-absorbing properties, retaining the molded cones in said mold and in contact with said slab to cause the same to harden as a result of moisture absorption by the mold and slab and the drying effects of atmospheric air at normal temperatures, and thereafter removing the cones from the mold cavities and subjecting the same to higher drying temperatures.

GEORGE A. BOLE.
MYRIL C. SHAW.
HARRY E. CO VAN.